No. 658,002. Patented Sept. 18, 1900.
P. BOGER.
STRAW STACKER.
(Application filed Aug. 21, 1899.)
(No Model.)
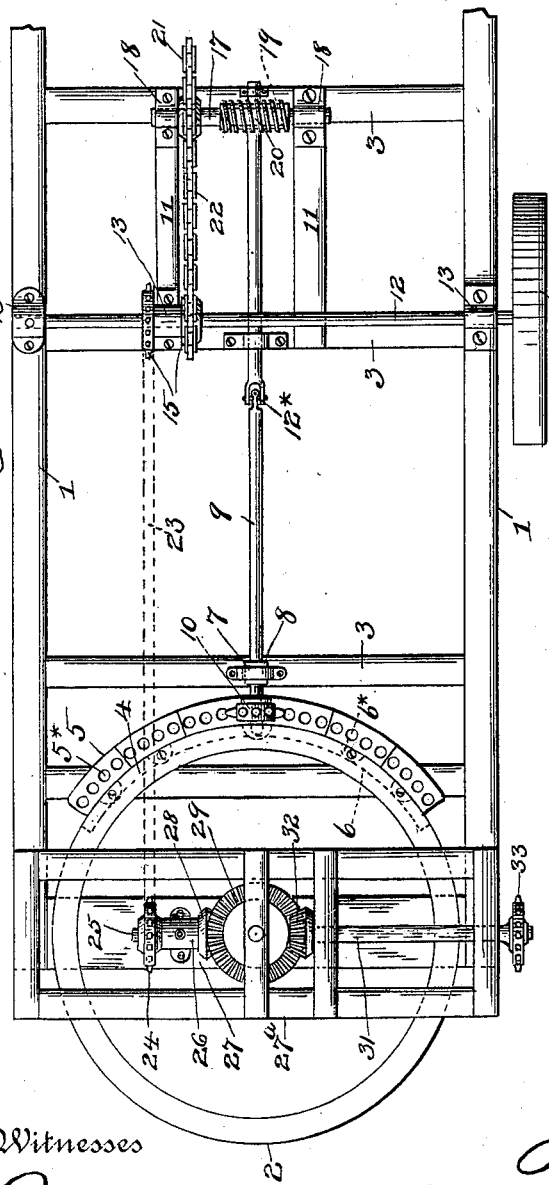
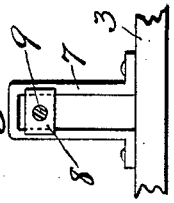
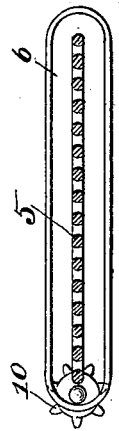
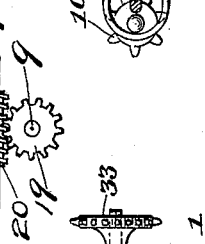
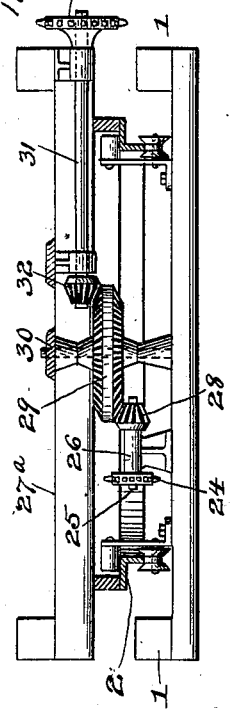
Witnesses
Jas. H. Blackwood
Hartwell P. Heath
Inventor
Peter Boger
by D. A. Gomick
Attorney
THE NORRIS PETERS CO., PHOTO-LITHO., WASHINGTON, D. C.

UNITED STATES PATENT OFFICE.

PETER BOGER, OF MARION, OHIO, ASSIGNOR TO EDWARD HUBER, OF SAME PLACE.

STRAW-STACKER.

SPECIFICATION forming part of Letters Patent No. 658,002, dated September 18, 1900.

Application filed August 21, 1899. Serial No. 728,000. (No model.)

*To all whom it may concern:*

Be it known that I, PETER BOGER, a citizen of the United States, residing at Marion, in the county of Marion and State of Ohio, have invented certain new and useful Improvements in Straw-Stackers, of which the following is a specification.

My invention relates to straw-stackers, and has for its object to provide an automatic oscillating stacker of simple construction and having fewer parts than those now in use, thus avoiding the necessity of employing a skilled mechanic to remedy working defects while the same is being operated. This object I accomplish in the manner and by the means hereinafter more fully described in detail, and particularly pointed out in the claims, reference being had to the accompanying drawings, in which like numerals represent like parts in all of the figures.

Figure 1 is a top plan view of my invention. Fig. 2 is a rear elevation of same, partly in section; Fig. 3, a detail view of the worm-gear; Fig. 4, a detail view of the guide or bracket and sliding journal-box, and Fig. 5 a detail view of the perforated rack and pinion.

A rectangular frame 1, of the usual form, having the stacker turn-table 2 mounted in the ordinary way at one end, has three cross-pieces 3 at suitable intervals. The turn-table 2 is provided around its periphery with an angle-iron 4. A rack 5 has perforated ears 6*, adapted to receive and be secured to the angle-iron 4. Said rack 5 may be made in sections, so that its length may be regulated as desired. Each end section of said rack 5 has a semicircular grooved channel 6 at one end. On the middle of the cross-piece 3 nearest the edge of said turn-table 2 is mounted a guide or bracket 7, in which a journal-box 8 moves. In the journal-box 8 a shaft 9 is journaled. Near the end of the shaft 9 is a pinion 10, which meshes with the perforations of said rack 5. The end of the shaft 9 extends a short distance beyond the pinion 10 and travels in the groove 6 in passing from the upper to the lower side of the rack 5, or vice versa. The other two cross-pieces 3 are connected intermediate the sides of the frame 1 by two braces 11, separated by a suitable interval. The driving-shaft 12 is journaled on brackets 13, mounted on the frame 1 and on the end of one of the braces 11. The driving-shaft 12 is provided at one end with the driving-wheel 14. On the driving-shaft 12, on each side of the intermediate journal-bearing of said shaft 12, is a sprocket-wheel 15. The shaft 9 passes beneath the driving-shaft 12 and is provided with a knuckle-joint 12*. A short shaft 17 has its ends journaled in brackets 18, mounted on the ends of the braces 11. On the end of the shaft 9 is a worm-wheel 19, which meshes with a worm 20 on the shaft 17. A large sprocket-wheel 21 is mounted on the shaft 17 and connected by the chain 22 with one of the sprocket-wheels 15. The other sprocket-wheel 15 is connected by a chain with the sprocket-wheel 24, mounted on one end of a short shaft 25, journaled on a bracket 26, secured to a frame 27, extending across the end of frame 1 below the turn-table 2 and supported by said frame 1. On the other end of the shaft 25 is mounted a bevel cog-wheel 28, which meshes with the lower cogs in a double-beveled cog-wheel 29, mounted on a vertical shaft 30, carried by frame 27. A horizontal shaft 31 is journaled in bearings secured to the under side of the upper cross-pieces of frame 27ª. Said shaft 31 has at its inner end a beveled-cog-wheel 32, which meshes with the upper cogs of the double-beveled cog-wheel 29, and at its outer end, which extends outside said frame 1, is provided with a sprocket-wheel 33, adapted to drive the web of the straw-stacker.

The operation of my invention is as follows: Power is applied to the driving-wheel 14 and transmitted by the shaft 12, sprocket-wheel 15, and chain 22 to the large sprocket-wheel 21. This revolves the shaft 17 and worm 20, which through the worm-wheel 19 turns the shaft 9. The pinion 10 travels along the rack 5, being guided from the upper to the lower side of the rack 5 by the end of the shaft 9 entering and following the grooved channel 6. The change of the pinion 10 from the upper to the lower side of the rack 5, and vice versa, reverses the movement of the turn-table 2, causing it to oscillate back and forth. To regulate the distance the turn-table 2 shall turn from side to side, the rack 5 is made in adjustable sections, each end section being provided with the grooved channel 6. To permit the passage of the pinion 10 from the upper to the lower side of the rack 5, the journal-box 8 slides up and down in the guide 7, and to accommodate the changing angle of the shaft 9 the knuckle-joint is provided. The same power at the same time through the other sprocket-wheel 15, chain 23, and sprocket-wheel 24 communicates motion to the shaft 25 and the cog-wheels 28, 29, and 32 and through them to the shaft 31 and sprocket-wheel 33, which drives the web.

Having thus described my invention, what I claim as new, and desire to secure by Letters Patent, is—

1. A straw-stacker comprising a turn-table adapted to move in a horizontal plane, a perforated sectional rack mounted thereon, a vertically-adjustable journal-box, a stationary journal-box, a guide or bracket, a revoluble shaft made in sections, one of said sections supported in the stationary journal-box, and the other section supported in the adjustable journal-box in the said guide or bracket, said shaft provided with a pinion adapted to engage the said rack, and means for operating the said shaft and pinion, substantially as shown and described.

2. A straw-stacker comprising a frame, a turn-table, a perforated sectional rack mounted thereon, a guide or bracket on said frame, a vertically-slidable journal-box carried by said guide, a stationary journal-box, a revoluble shaft made in sections connected together by a knuckle-joint, one section mounted in the stationary journal-box and its end having a worm-gear thereon, and the other section mounted in the slidable journal-box, guides at the opposite ends of said rack in which the end of the said section is adapted to move, and means for operating the said straw-stacker, substantially as shown and described.

3. A straw-stacker comprising a frame, a turn-table, a perforated sectional rack or plate mounted thereon, a sectional shaft provided with a pinion adapted to engage said perforated rack, and the end of said shaft extending beyond said pinion, a guide at each end of said rack for the purpose of guiding the said extended end of the shaft as the pinion moves around the end of the rack while traveling from the upper to the lower surface of said rack, and means for operating said shaft and pinion, substantially as shown and described.

In testimony whereof I hereto affix my signature in the presence of two witnesses.

PETER BOGER.

Witnesses:
 FRANK G. NORTON,
 JAMES G. FAIRBANKS.